Nov. 15, 1932.  J. CAIN  1,887,991
CAMERA
Filed July 20, 1931
Fig.1.
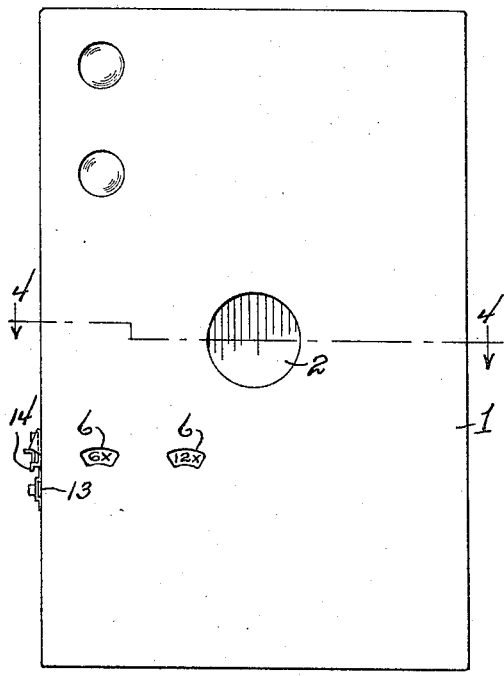
Fig.3.
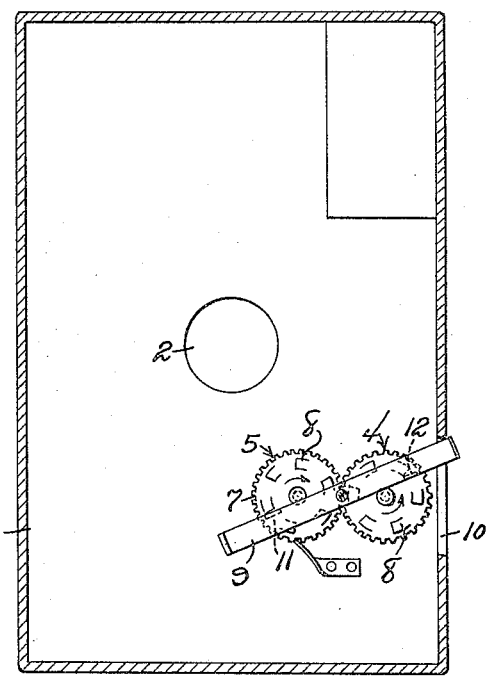
Fig.2.
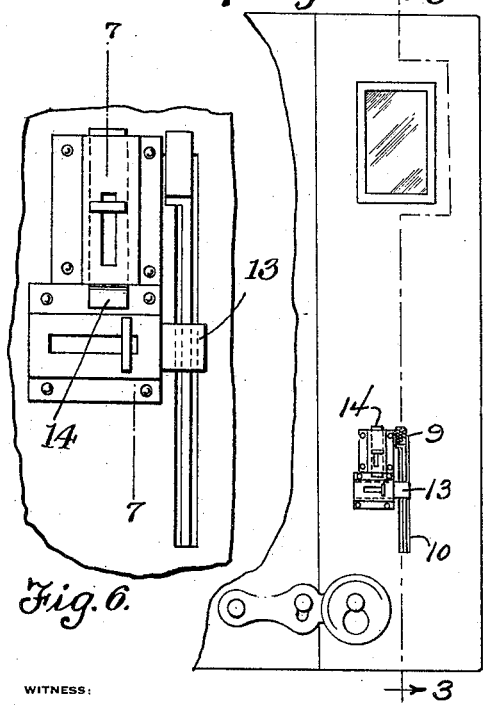
Fig.4.
Fig.6.
Fig.5.
Fig.7.
John Cain
INVENTOR
BY Victor J. Evans
and Co. ATTORNEY
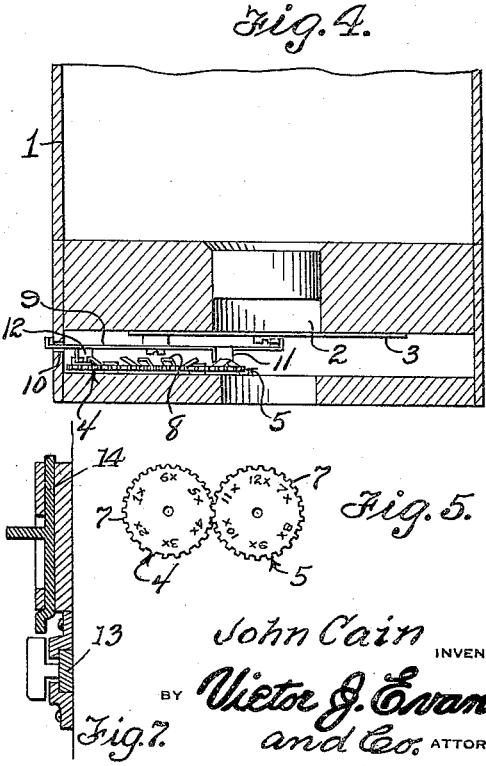
WITNESS:

Patented Nov. 15, 1932

1,887,991

UNITED STATES PATENT OFFICE

JOHN CAIN, OF CHICAGO, ILLINOIS

CAMERA

Application filed July 20, 1931. Serial No. 552,021.

This invention relates to an exposure indicator and safety trigger for cameras and it consists in the novel features hereinafter described and claimed.

An object of the invention is to provide an exposure indicator which eliminates all doubt as to whether the film opposite the lens in the camera has been exposed, thus preventing double exposure or turning another film into position without the previous film having been exposed.

A further object of the invention is to provide locking means which will prevent accidental exposure of the film and which also serves as means for reminding the operator that a film has been exposed before turning a new film into position.

In the accompanying drawing:—

Figure 1 is a front elevational view of the camera.

Figure 2 is a fragmentary side elevational view of the same.

Figure 3 is a sectional view of the camera cut on the line 3—3 of Figure 2.

Figure 4 is a horizontal sectional view of the camera cut on the line 4—4 of Figure 1.

Figure 5 is a side elevational view of disks used in the camera.

Figure 6 is an enlarged detail elevational view of the latch mechanism.

Figure 7 is a sectional view on the plane indicated by the line 7—7 of Figure 6.

The body of the camera 1 is in the form of a box having a lens opening 2 and a shutter 3 adapted to move over said opening. Disks 4 and 5 are journaled at the inner side of the front wall of the box 1, the disk 4 having a series of numbers upon the face thereof, said numbers being from 1 to 6 inclusive and the disk 5 is provided with a series of numbers from 7 to 12 inclusive. The numbers upon the disks 4 and 5 may be observed through openings 6 provided in the front wall of the body of the box. The disks 4 and 5 are provided with peripheral teeth 7 which mesh with each other. The disks 4 and 5 are provided at their inner sides with inclined lugs 8 the lugs upon the disk 4 being inclined in the opposite direction from the lugs upon the disk 5. A lever 9 is pivoted within the body 1 and one end of the said lever is operatively connected with the shutter 3. The other end portion of the lever 9 passes through an opening 10 provided in the side of the body 1. The lever 9 is provided with lugs 11 and 12. The lug 11 is adapted to engage one of the lugs 8 of the disk 5 when the lever 9 is swung in one direction and the said lug 11 is adapted to pass over the lug 8 of the disk 5 when the lever is swung in an opposite direction. When the lug 11 passes over the lugs 8 of the disk 5 the lug 12 upon the lever 9 will engage the lugs upon the disk 4. A bolt 13 is slidably mounted at the side of the box 1 and may be passed under the other end of the lever 9 thus preventing the lever from being swung. A bolt 14 is slidably mounted at the side of the body 1 and when the bolt 13 is moved from under the lever the bolt 14 may be moved across the bolt 13 thus preventing the bolt 13 from moving.

When the lever 9 is swung one of the lugs thereof engages one of the lugs of the disk and consequently the disks are turned so that indicating numbers are brought to view through the openings 6 in the front wall of the body of the camera. The numbers so brought to view and compared with the number upon the film will indicate whether or not the film has been exposed.

Having described the invention what is claimed is:

A camera comprising a body having a lens opening and a shutter movable over said opening, a lever operatively connected with the shutter and provided with lugs located at opposite side edges, a pair of disks journaled in the body and engaging each other, said disks being provided at their sides with lugs adapted to be engaged by the respective lugs of the lever and the disks having upon their faces series of numbers visible through the side of the body.

In testimony whereof I affix my signature.

JOHN CAIN.